United States Patent [19]

Lecouteux et al.

[11] Patent Number: 6,022,567

[45] Date of Patent: Feb. 8, 2000

[54] FLAVOR ENHANCER

[75] Inventors: Claude Lecouteux, New Milford, Conn.; Hugues Guichard, Macon, France

[73] Assignee: Nestec S.A., Vevey, Switzerland

[21] Appl. No.: 09/103,248

[22] Filed: Jun. 23, 1998

[51] Int. Cl.[7] .............................. A23C 9/12; A23C 20/02
[52] U.S. Cl. ................. 426/35; 426/36; 426/534
[58] Field of Search .................. 426/36, 41, 42, 426/533, 534, 580, 582, 585, 650, 35

[56] References Cited

U.S. PATENT DOCUMENTS

| | | | |
|---|---|---|---|
| 3,720,550 | 3/1973 | Lukas | 99/104 R |
| 4,500,549 | 2/1985 | Crossman | 426/33 |
| 4,675,193 | 6/1987 | Boudreaux | 426/35 |

FOREIGN PATENT DOCUMENTS

| | | |
|---|---|---|
| 0 137 536 | 8/1984 | European Pat. Off. . |
| 2 247 793 | 6/1978 | France . |
| 1 377 120 | 12/1972 | United Kingdom . |

*Primary Examiner*—Keith Hendricks
*Attorney, Agent, or Firm*—Pennie & Edmonds LLP

[57] ABSTRACT

A process for enhancing the cheese flavor of a cheese flavored food product and the cheese flavored food product produced thereby. A natural cheese flavor enhancer is prepared by incubating sufficient amounts of a protein, a fat, a protease, and a lipase in an aqueous medium under temperature, pH, and time conditions sufficient for producing a cheese flavor enhancer which is capable of enhancing the cheese flavor of food products that include a cheese flavor component but not of food products that do not contain a cheese flavor component. The natural cheese flavor enhancer is then added to a food product that contains a cheese flavor component. The natural cheese flavor enhancer is added in an amount sufficient to enhance the cheese flavor of the product. Alternatively, the natural cheese flavor enhancer can be added to replace a portion of the cheese flavor component without loss of cheese flavor of the product.

18 Claims, No Drawings

FLAVOR ENHANCER

FIELD OF THE INVENTION

The present invention relates to a flavor enhancer and more particularly to a natural cheese flavor enhancer which boosts the cheese flavor in cheese containing products.

BACKGROUND OF THE INVENTION

Currently, natural cheese flavors are made from starting materials such as aged cheese, cheese block or cheese curds which are expensive. Also, it is well known that cheese based raw materials are of variable and unreliable quality. Such starting materials are usually treated with enzymes such as proteases and it is well known that enzyme modified cheese products have an unpleasant bitter flavor. In addition, in some cases, incubation with microorganisms such as *Penicillium roqueforti* or lactic acid bacteria is carried out for up to 48 hours or more which increases the cost and makes the process rather complicated and time-consuming.

SUMMARY OF THE INVENTION

We have now devised a process for the preparation of a natural cheese flavor enhancer with reduced bitterness compared with other enzyme modified cheese products and which eliminates the need for the employment of expensive raw materials. In our process, the starting materials are proteins and fats rather than the more expensive aged cheese, cheese block or cheese curds and, in addition microorganisms are not used.

Accordingly, the present invention provides a process for the preparation of a natural cheese flavor enhancer which comprises incubating a protein, a fat, a protease and a lipase in an aqueous medium under conditions suitable for producing a cheese flavor enhancer.

It should be understood that in this invention, the cheese flavor enhancer is not a cheese flavor in itself: if it is added to a bland product, it does not impart any specific flavor. On the other hand, when the cheese flavor enhancer is added to a cheese-containing product, it enhances the cheese flavor enabling the amount of expensive cheese normally present in the product to be reduced substantially.

DETAILED DESCRIPTION OF THE INVENTION

Any edible protein or fat may be used in the process of the invention. Preferred examples of protein are whey protein concentrate, lactalbumin or casein, preferably rennet casein, sodium or calcium caseinate. The fat may be an animal or vegetable fat but preferred examples of fats are corn oil, shortening® (partially hydrogenated soybean and cottonseed oils, mono- and diglycerides), heavy cream or butter. If desired, mixtures of proteins and/or mixtures of fats may be used. The amount of protein used may be from 1 to 30%, preferably from 5 to 25% and more preferably from 10 to 16% by weight based on the total weight of the aqueous medium. The amount of fat may be from 5 to 50%, preferably from 10 to 40% and more preferably from 20 to 35% by weight based on the total weight of the aqueous medium.

If desired, a small amount of whey protein may be added to the aqueous medium, e.g. from 1 to 10% and preferably from 2 to 6% by weight based on the total weight of the aqueous medium. Whey protein is used as a filler and allows to increase the solid content of the cheese enhancer with a limited impact on the flavor and the cost.

Any protease or lipase may be used in the process of the invention. For example, the protease may be Protease 2A manufactured by Amano Enzyme Co., a neutral protease, e.g. Protease P Amano 6 manufactured by the Amano Enzyme Co., or Neutrase or Flavourzyme manufactured by Novo Nordisk, Inc. A mixture of one or more proteases may be used if desired. The amount of protease used may be from 0.05 to 1.0% and preferably from 0.1 to 0.75% by weight based on the total weight of the aqueous medium.

The lipase may be pancreatic lipase manufactured by Valley Research Inc., pregastric esterase manufactured by Amano Enzyme Co., or a fungal lipase such as Palatase 20,000L manufactured by Novo Nordisk Inc. or any mixture thereof.

The amount of lipase used may be from 0.05 to 1.0% and preferably from 0.1 to 0.75% by weight based on the total weight of the aqueous medium.

The amount of water in the aqueous medium may be from 25 to 75%, preferably from 35 to 65% and more preferably from 40 to 60% by weight based on the total weight of the aqueous medium.

Salt may be added, if desired, e.g. in an amount of from 0.5 to 5%, preferably from 1 to 3.5% by weight based on the total weight of the aqueous medium.

Other ingredients conventionally used in cheese making may also be added to the aqueous medium, e.g. trisodium phosphate in an amount up to 2% and preferably from 0.5 to 1.5%, a fungicide such as sorbic acid or potassium sorbate in an amount up to 0.5% and preferably from 0.05 to 0.25% by weight, and a thickener or stabilizer such as xanthan gum, guar gum or carrageenan, etc. in an amount up to 0.50% and preferably from 0.02 to 0.2% all amounts being by weight based on the total weight of the aqueous medium.

The incubation is conveniently carried out in a reaction vessel, such as an incubator. The ingredients are loaded into the reaction vessel, preferably in the following order: the water is introduced first followed by the protease, then the proteins, then the lipase and finally the fats. Advantageously, the trisodium phosphate and the salt are added with the water while the fungicides, thickeners and/or stabilizers are preferably added after the addition of the proteins but before the addition of the fats.

The temperature of the incubation may be from 37° to 48° C. (100° to 117° F.) and preferably from 39° to 46° C. (104° to 113° F.).

The pH of the incubation may be from 4 to 6, preferably from 4.5 to 5.5.

The duration of the incubation may be from 12 to 48 hours, preferably from 18 to 36 hours. The incubation is carried out in the absence of any added microorganism.

After incubation, the pH may be adjusted to 4.2–4.4, preferably with phosphoric acid.

After incubation, the product is advantageously homogenized and then pasteurized, e.g. at a temperature from 90° C. to 100° C. for a period of from 2.5 to 10 minutes, preferably at a temperature from 94° C. to 99° C. for a period of from 4 to 8 minutes. After pasteurization, the product is conveniently cooled, e.g. to a temperature of from 4° to 10° C. to give a product having the consistency of a paste.

The product may be used as a paste or dried and used as a powder. The drying is preferably achieved by spray drying, using a carrier, for instance, maltodextrin in an amount of from 20 to 40% by weight based on the weight of the paste. The moisture content of the final powder is usually from about 2.0 to 4.0% by weight.

The natural cheese flavor enhancer produced by the process of the present invention may be used to enhance the flavor of cheese-containing products such as cheese sauces, cheese dips and salad dressing.

The present invention therefore also provides a cheese-containing product containing an effective amount of the natural cheese flavor enhancer obtainable by the process of the present invention.

The amount of the natural cheese flavor enhancer added to the cheese-containing product may be from 0.1 to 5%, preferably from 0.25 to 2.5% and more preferably from 0.5 to 1.5% by weight by weight based on the total weight of the cheese-containing product.

EXAMPLES

The following Examples further illustrate the present invention. Parts and percentages are given by weight except where stated.

Example 1

50 parts of water are mixed with 0.35 parts of Protease 2A, 2.229 parts of NaCl and then 1 part of trisodium phosphate and loaded into a 500 gallon liquefier. This is followed by in order of addition: 4.244 parts of sweet whey, 13.5 parts of rennet casein (30 mesh), 0.1 part of potassium sorbate, 0.05 parts of xanthan gum (Keltrol RD), 0.35 parts of pancreatic lipase and 28.177 parts of butter. The ingredients are ground and then pumped to a 300 gallon reaction tank jacketed with water at 45° C. (113° F.), and incubated for 24 hours. After incubation, the pH is adjusted to 4.2–4.4 with phosphoric acid.

The product is then piston homogenized at 500 psi. The homogenized mixture is pumped to a plate heat exchanger and pasteurized at 95° C. (203° F.) for 5 minutes in a holding tube, cooled to 4.5° C. (40° F.) and transported to a filler where it is packaged and stored at 5° C. (41° F.).

Example 2

The cheese content of a cheese sauce normally containing 33% of cheese is reduced to 25%. To 100 parts of the cheese sauce containing 25% of cheese is added 1 part of the natural cheese flavor enhancer prepared in Example 1. The cheese flavor of the cheese sauce containing the natural cheese flavor enhancer is as good as that of the cheese sauce containing 33% of cheese.

We claim:

1. A process for enhancing the cheese flavor of a cheese flavored food product which comprises: preparing a natural cheese flavor enhancer by incubating sufficient amounts of a protein, a fat, a protease, and a lipase in an aqueous medium under temperature, pH, and time conditions sufficient for producing a cheese flavor enhancer which is capable of enhancing the cheese flavor of food products that include a cheese flavor component but not of food products that do not contain a cheese flavor component; and adding the natural cheese flavor enhancer to a food product that contains a cheese flavor component, the natural cheese flavor enhancer being added in an amount sufficient to enhance the cheese flavor of the product.

2. A process according to claim 1 wherein the protein used is a casein, a whey protein concentrate or lactalbumin.

3. A process according to claim 1 wherein the fat used is a vegetable oil.

4. A process according to claim 1 wherein the fat used is corn oil, heavy cream or butter.

5. A process according to claim 1 wherein at least one of a mixture of proteins or a mixture of fats is used.

6. A process according to claim 1 wherein the amount of protein used is from 1 to 30% by weight based on the total weight of the aqueous medium.

7. A process according to claim 1 wherein the fat is used in an amount of 5 to 50% by weight based on the total weight of the aqueous medium.

8. A process according to claim 1 wherein whey protein is added to the aqueous medium in an amount of 1 to 10% by weight based on the total weight of the aqueous medium.

9. A process according to claim 1 wherein the protease is used in an amount of 0.05% to 1.0% by weight based on the total weight of the aqueous medium.

10. A process according to claim 1 wherein the lipase is used in an amount of 0.05% to 1.0% by weight based on the total weight of the aqueous medium.

11. A process according to claim 1 wherein the amount of water in the aqueous medium is in the range of 25 to 75% by weight based on the total weight of the aqueous system.

12. A process according to claim 1 wherein the ingredients are loaded into a reaction vessel wherein the water is introduced first followed by the introduction of the protease, then the proteins, then the lipase and finally the fats.

13. A process according to claim 1 wherein the temperature of the incubation is in the range of 37° to 48° C. (100° to 117° F.).

14. A process according to claim 1 wherein the pH of the incubation is in the range of 4 to 6.

15. A process according to claim 1 wherein the duration of the incubation is in the range of 12 to 48 hours.

16. A process according to claim 1 wherein, after incubation, the product is homogenized and then pasturized before cooling to a temperature in the range of 4° to 10° C.

17. A process according to claim 1 wherein the cheese flavor enhancer is made into a paste or powder.

18. A process according to claim 1 wherein the moisture content of the final powder is in the range of about 2.0 to 4.0% by weight.

* * * * *